May 4, 1943.　　　J. T. DOCKERY　　　2,318,297
GAS GENERATING APPARATUS
Filed Feb. 1, 1940　　　2 Sheets-Sheet 1

Inventor
John T. Dockery

By Clarence A. O'Brien
and Hyman Berman
Attorneys

May 4, 1943.　　J. T. DOCKERY　　2,318,297
GAS GENERATING APPARATUS
Filed Feb. 1, 1940　　2 Sheets-Sheet 2
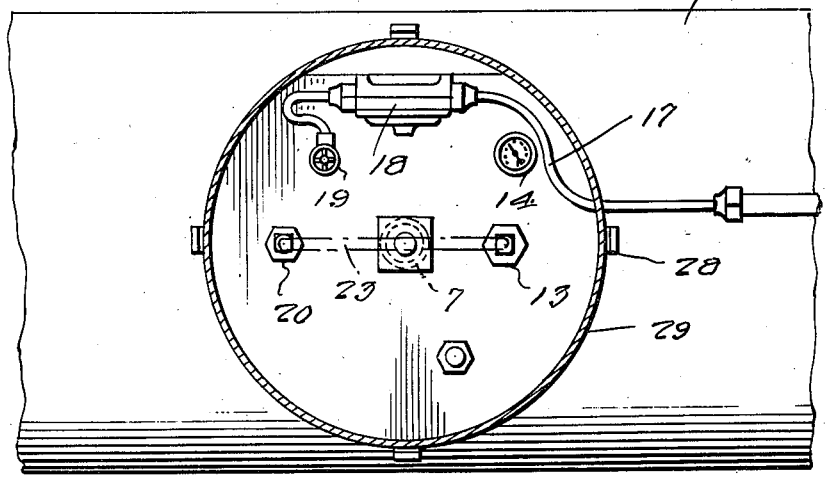
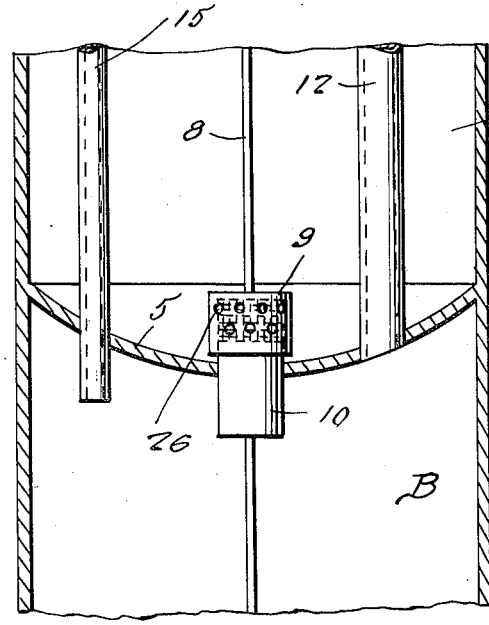
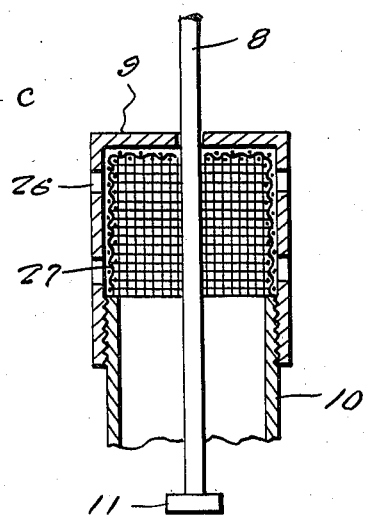
Inventor
John T. Dockery Patented May 4, 1943

2,318,297

UNITED STATES PATENT OFFICE 2,318,297

GAS GENERATING APPARATUS

John T. Dockery, Jackson, Miss., assignor of one-third to J. P. Dockery, Jackson, Miss., and one-third to Ernest L. Shelton, Jackson, Miss.

Application February 1, 1940, Serial No. 316,836

13 Claims. (Cl. 62—1)

The present invention relates to butane gas generating systems embodying a unitary gas vaporizing and collecting apparatus and apparatus for filling and dispensing liquefied gas by the use of dual stripper tanks or gas collecting reservoirs and among other objects provides a novel, simplified and reliable vaporizing and filling and dispensing unit to be used in household installations. This invention involves the utilization of and improvements on the apparatus disclosed in my Patent No. 2,172,021. One of the objects of the invention is to provide a vaporizing, gas collecting, filling and dispensing apparatus for connection to a storage tank adapted to be assembled as a unit and then connected to the main storage tank by means of a single pipe and so constructed that one pipe not only serves for the support of the dual gas collecting reservoirs or stripper tanks to which all of the appurtenances are anchored, but also provides a filling and discharge pipe for the system.

In the present invention I use dual stripper tanks or gas collecting reservoirs so constructed that all appurtenances are anchored thereto, and filled and discharged through said stripper tanks.

A further object of the invention is to provide the use of dual gas collecting reservoirs or stripper tanks, the use of which not only increases the efficiency of the system in that the saturated vapors are more thoroughly stripped, vaporized, dried out and expanded before passing through the regulator but the use of the dual gas collecting reservoirs provides a means that enables the system to remain in use while a filling operation is in progress, thus insuring the uninterrupted use of the system while the system is being refueled.

A further object of the invention is to provide a means and a filter between the dual gas collecting reservoirs or stripper tanks adapted to break up particles of wet gas passing from the lower collecting reservoir before same enters the upper collecting reservoir.

A further object of the invention is the adaptation of an apparatus of this character embodying a single pipe for the filling of the storage tank and for the initial discharge of gas generated therein, thus cutting down the number of openings in the main underground gas storage reservoir and the possibility of underground leaks and the loss of fuel and the dangers as a consequence thereof, and further for economy in construction and assembly. This is accomplished by simply filling through the lower gas collecting reservoir or stripper tank and the utilization of a single pipe as both a filler pipe and a discharge pipe; and the utilization of the upper stripper tank or gas collecting reservoir for the purposes of supporting the appurtenances.

Both the main storage tank and the stripper tanks are buried underground and I utilize the reserve heat of the earth for the purpose of keeping the liquefied gas above its boiling point in the main storage tank and the generated vapors from condensing in the gas collecting reservoirs or stripper tanks.

Other objects and advantages reside in the details of construction and operation as more fully hereinafter described and claimed, reference being had to the accompanying drawings forming part hereof, wherein like numerals refer to like parts throughout, and in which—

Figure 2 is a horizontal sectional view through the cover for the tank.

Figure 3 is a fragmentary sectional view through the partition between the upper and lower stripper tanks, and Figure 4 is a fragmentary vertical sectional view through the screen mounted in the partition between said tanks.

Figure 1:
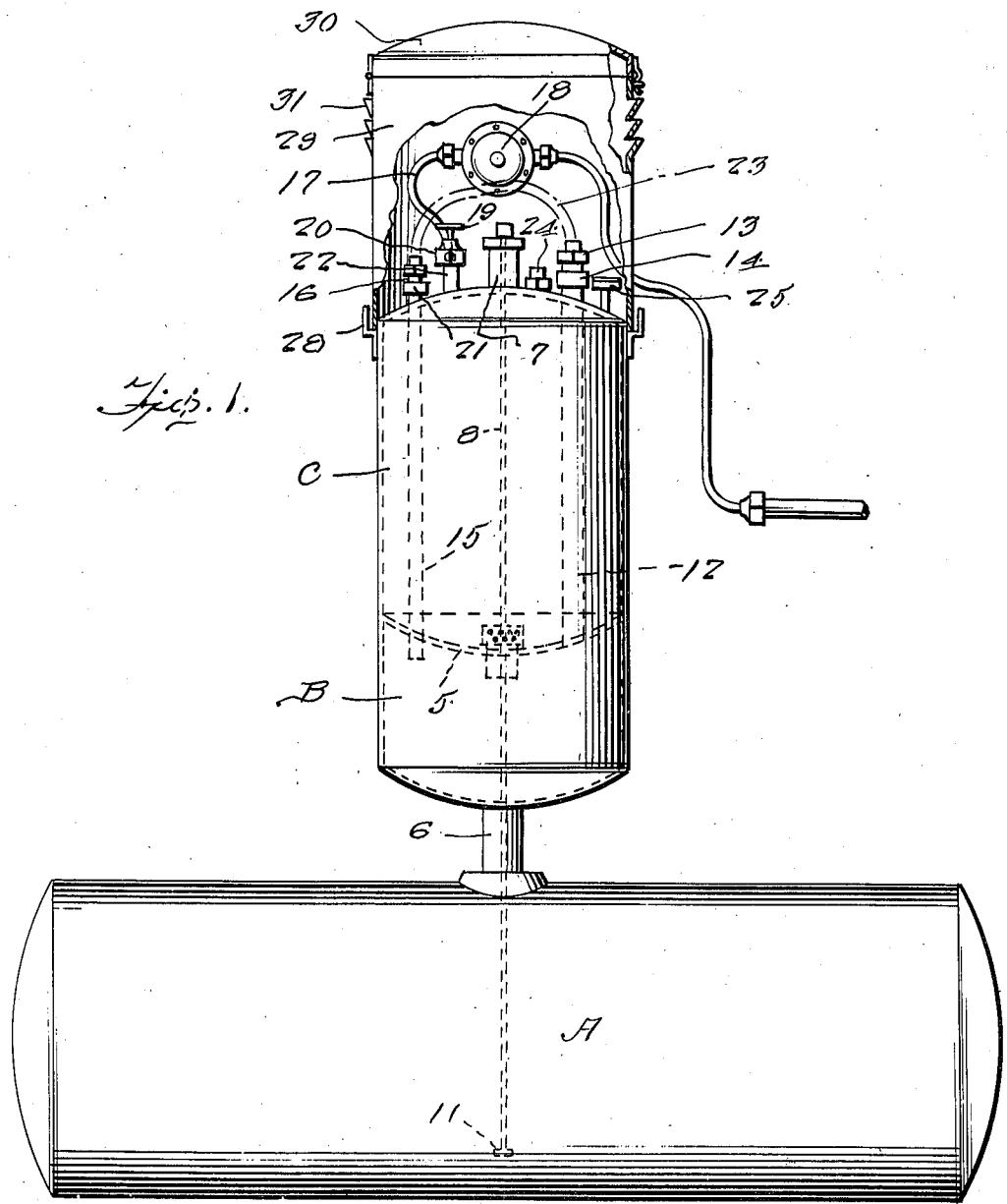
Figure 1 is a side elevational view with parts broken away and shown in sections.

Referring now to the drawings in detail, the letter A represents the main liquid storage tank, B represents the lower stripper tank or gas collecting reservoir, and C the upper stripper tank or gas collecting reservoir. The tanks B and C are of unitary construction of cylindrical form having the horizontal partition 5 defining the two tanks and said tanks are supported in an upright position on the tank A by a short pipe 6, the pipe serving the double function of a support and conduit between the tanks A and B. In accordance with my invention the single pipe 6 serves not only as the discharge pipe for the vapors generated in and passing from tank A to the lower stripper tank B, but also serves as a filler pipe when the system is being refueled, and allows the liquefied gas to flow from the stripper tank B into the storage tank A. The pipe 6 is sufficiently large to allow the vapors impounded in tank A to escape while said tank is being filled.

Mounted on the top of the upper stripper tank C is a tubular nipple 7 through which the slip tube gauge rod 8 works. The gauge rod extends downwardly through the tank C and downwardly through the cap 9 which is threaded on the tubular connector 10 positioned in the partition 5 and which provides the communication between the upper and lower stripper tanks. The lower end of the rod is provided with a stop 11 to prevent its complete withdrawal from the tank.

Positioned in the upper stripper tank C is a filler pipe 12 having its upper end projecting through the top of the tank and its lower end passing through the partition 5, the upper end of the pipe being provided with a filler valve 13 and excess flow valve 14. The main tank A is adapted to be filled through the filler pipe 12 which empties into the lower stripper tank B which acts as a filling receptacle and the liquefied gas by gravity drains down through the pipe 6 into the storage tank A. The filler pipe 12 is sufficiently small in order that the amount of liquid entering the tank B will drain into the main tank A through the pipe 6 which is sufficiently large to allow not only the flow of liquid but also allows the vaporized gas impounded in the tank A to pass out through the pipe 6 into the lower stripper tank B. From the lower tank B the gas may pass upwardly through the tube 10 into the upper tank C, or the gas may pass upwardly through a vapor outlet pipe 15 which has its lower end inserted through the partition 5 into the lower tank B and has its upper end extending upwardly through the top of the tank C.

A gas outlet pipe 22 extends upwardly from the top of the upper stripper tank C to which a supply pipe 17 is connected, and having interposed therein a reducing regulator 18. The pipe 22 is also provided with a house line valve 19 and an automatic valve 20 adapted to cut off the gas in case of breakage of the house line leading from the outlet pipe.

The pipe 15 serves as an overflow pipe for the escape of excess liquefied gas delivered to the system, thereby preventing and avoiding the possible rupture of the system due to overfilling through the pipe 12.

As liquefied gas is being delivered into the main storage tank A, vaporized gas therein is allowed to escape through the pipe 6 into the lower stripper tank B and out through the pipe 15. The upper end of the pipe 15 is equipped with an excess flow valve 21 and a vapor valve 16, the upper end of whose casing is threaded to receive the connection from a hose 23 leading from the upper portion of the truck or filling tank (not shown). When the filling operation is in progress the filling hose from a truck tank is connected to the filling valve 13 and the vapor valve is connected to the hose from the upper portion of the truck tank and the vapor pressure is equalized in the two tanks and the liquefied gas will flow into the storage tank A by gravity while the displaced gas in the storage tank is removed through the vapor outlet 16 back into the filling tank. When said connection is disconnected the upper end of the casing of the valve 21 may be closed by a plug (not shown), or the hose 23 may remain attached at one end to the valve and its other end attached to the filler valve 13 as shown by the dotted lines in Figure 1 to prevent escape of the vapor from the stripper tank B. The top of the upper stripper tank C is also provided with a safety valve 24 to prevent excess pressure in the tank A and stripper tanks B and C. A pressure gauge 25 is also mounted in the top of the tank C.

The cap 9 on the tubular connector 10 is perforated as shown at 26 and positioned within the cap is a fine mesh cup screen 27 adapted to break up the vapor before the same enters the upper stripper tank C from the lower stripper tank B.

Secured to the side walls of the tank C, adjacent the top thereof, are a plurality of brackets 28 upon which is positioned the housing 29 which encloses the valves and other equipment mounted on the top of the tank. The top of the housing is provided with a hinged cover 30 to provide access to the equipment and the side walls of the housing are formed with ventilating openings 31.

The main storage tank A and stripper tanks B and C are adapted to be buried in the ground to such a depth that only the upper end of the housing is exposed.

It is believed the details of construction, advantages and manner of operation of the apparatus will be readily understood from the foregoing without further detailed explanation.

Having thus described the invention, what I claim is:

1. A gas generating and distributing apparatus comprising a main liquefied gas tank adapted to be buried underground, a common filler and gas discharge pipe rising from said tank and a stripper tank of a diameter greater than the diameter of the pipe and connected to said pipe above the latter, and means in the stripper tank separating the same into a plurality of superposed communicating stripper reservoirs.

2. A gas generating and distributing apparatus comprising a main liquefied gas tank adapted to be buried underground, a common filler and gas discharge pipe rising from said tank, a stripper tank connected to and supported by said pipe and a partition in said stripper tank separating the same into a plurality of superposed communicating gas collecting chambers.

3. A gas generating and distributing apparatus comprising a main liquefied gas tank adapted to be buried underground, a common filler and gas discharge pipe rising from said tank, a stripper tank connected to and supported by said pipe, a horizontal partition in said stripper tank separating the same into upper and lower gas collecting chambers and a mist separator between said chambers.

4. A gas generating and distributing apparatus comprising a main liquefied gas tank adapted to be buried underground, a common filler and gas discharge pipe rising from said tank, a stripper tank connected to and supported by said pipe, a horizontal partition in said stripper tank separating the same into upper and lower gas collecting chambers, a passage in the partition providing communication between said chambers and a filter in said passage.

5. A gas generating and distributing apparatus comprising a main liquefied gas tank adapted to be buried underground, a common filler and gas discharge pipe rising from said tank, a stripper tank connected to and supported by said pipe, a horizontal partition in said stripper tank separating the same into upper and lower gas collecting chambers, a passage in the partition providing communication between said chambers and a filler pipe extending through the upper chamber for supplying liquefied gas to the lower chamber.

6. A gas generating and distributing apparatus comprising a main liquefied gas tank adapted to be buried underground, a common filler and gas discharge pipe rising from said tank, a stripper tank connected to and supported by said pipe, a horizontal partition in said stripper tank separating the same into upper and lower gas collecting chambers, a passage in the partition providing communication between said chambers, a filler pipe extending through the upper chamber for supplying liquefied gas to the lower chamber, an overflow pipe extending from the lower chamber upwardly through the upper chamber and a service line connected to the upper chamber.

7. A gas generating and distributing apparatus comprising a main liquefied gas tank adapted to be buried underground, a common filler and gas discharge pipe rising from said tank, a stripper tank connected to and supported by said pipe, a horizontal partition in said stripper tank separating the same into upper and lower gas collecting chambers, a tube in the partition providing communication between said chambers, said tube being in vertical alignment with said pipe and a gauge rod having its lower end positioned in the main tank and extending upwardly through the pipe and the tube and having its upper end projecting outwardly of the upper chamber.

8. A gas generating and distributing apparatus comprising a main liquefied gas tank adapted to be buried underground, a common filler and gas discharge pipe rising from said tank, a stripper tank connected to and supported by said pipe, a horizontal partition in said stripper tank separating the same into upper and lower gas collecting chambers, a passage in the partition providing communication between said chamber, a pair of pipes communicating at one end with the lower gas collecting chamber, the other ends of said pair of pipes having atmospheric communication, one of said pair of pipes constituting a filler pipe and the other of said pair of pipes constituting a combined overflow pipe for excess liquid supplied to the lower gas collecting chamber as well as a vapor discharge pipe for excess vapor generated in the main gas tank.

9. A gas generating and distributing apparatus comprising a main liquefied gas tank adapted to be buried underground, a common filler and gas discharge pipe rising from said tank, a stripper tank connected to and supported by said pipe, a horizontal partition in said stripper tank separating the same into upper and lower gas collecting chambers, a tube in the partition providing a communication between said chambers, and means on the tube for extracting mist from the vapor passing therethrough and returning the same to the lower gas collecting chamber and to the main tank.

10. A gas generating and distributing apparatus comprising a main liquefied gas tank adapted to be buried underground, a common filler and gas discharge pipe rising from said tank, an upper gas collecting reservoir and a lower gas collecting reservoir communicating with each other, said lower gas collecting reservoir being connected to said pipe, and means at the point of communication between said reservoirs for extracting mist from the vapor passing therethrough and returning the same to the main tank.

11. A gas generating and distributing apparatus comprising a main liquefied gas tank adapted to be buried underground, a common filler and gas discharge pipe rising from said tank, a stripper tank connected to the upper end of said pipe, a horizontal partition in the stripper tank and separating the same into upper and lower communicating chambers, and a supply pipe communicating with the lower chamber of said stripper tank.

12. A gas generating and distributing apparatus comprising a main liquefied gas tank adapted to be buried underground, a common filler and gas discharge pipe rising from said tank, a stripper tank including a plurality of superposed communicating chambers, said pipe communicating with the lowermost chamber, and a supply pipe also communicating with the lowermost chamber.

13. A gas generating and distributing apparatus comprising a main liquefied gas tank adapted to be buried underground, an elongated stripper tank perpendicular to the main tank, a common filler and gas discharge pipe of reduced diameter connecting the tanks and supporting the stripper tank above the main tank, and superposed chambers in the stripper tank having restricted communication with each other.

JOHN T. DOCKERY.